Aug. 23, 1966  P. O. HAIN  3,268,354

COATING PROCESS AND PRODUCT

Filed March 23, 1962  3 Sheets-Sheet 1

INVENTOR
Paul O. Hain

BY John W. Teare
ATTORNEY

Aug. 23, 1966 P. O. HAIN 3,268,354
COATING PROCESS AND PRODUCT
Filed March 23, 1962 3 Sheets-Sheet 2

INVENTOR.
*Paul O. Hain*
BY *John W. Teare*
ATTORNEY

Aug. 23, 1966 P. O. HAIN 3,268,354
COATING PROCESS AND PRODUCT
Filed March 23, 1962 3 Sheets-Sheet 3

Inventor
Paul O. Hain
By John W. Teare
Attorney

United States Patent Office 3,268,354
Patented August 23, 1966

3,268,354
COATING PROCESS AND PRODUCT
Paul O. Hain, Hamilton, Ohio, assignor to Champion Papers Inc., Hamilton, Ohio, a corporation of Ohio
Filed Mar. 23, 1962, Ser. No. 182,024
10 Claims. (Cl. 117—64)

The present invention relates to coated paper having a finished surface particularly adapted for receiving print, especially high-tack inks, at high speed. The invention is more particularly directed to papers which are uniformly and continuously filmed with unusually thin coatings having level coating surfaces which are endowed with unique high qualities of printability, being readily compatible with and adaptable to high quality printing results by virtually all known printing techniques and processes, and to the manufacture of such papers.

It has in the past been known, particularly in the production of high gloss coated paper, that a variety of polishing or finishing techniques can be employed following a coating operation to improve surface properties and thereby provide finished papers especially adapted to receiving print.

Normally, these finished papers are produced using hydrophilic protein or starch containing coatings, but there are many disadvantages inherent in the use of such materials. These disadvantages are illustrated by the defect mottle, extreme losses in opacity and caliper, the need for critical coating conditions, i.e. to produce gels, or undesirable adherence to the polishing surface. In addition, the excessive quantities of these coatings required to provide a uniform surface for ink receptivity have often been uneconomical for many purposes and the coated paper so produced has been characterized by poor fold properties. Moreover, ink receptivity requires that the ink be absorbed into the coating leading to excessive ink consumption.

With special reference to finished papers of high gloss, it should be noted that these have been provided by cast coating, calendering—especially super-calendering, by brush finishing and by flint glazing.

While cast coatings have provided outstanding surface properties, their manufacture has been complicated by unusually low coating speeds, the need for special coatings applied and finished by complex and large equipment, and the need for coatings of great weight.

Calendering is a well known means of providing improved gloss characteristics of coated papers, but coating weights of at least 12–15 pounds per ream are normally needed for adequate coverage of the substrate, the surface levelness which is achieved leaves much to be desired, and the extensive repeated heat and pressure treatment significantly reduces the caliper and opacity of the stock to a degree which is excessive in comparison with the gloss which is achieved.

Brushing techniques have proven satisfactory for attaining suitable gloss values but otherwise are generally unsuitable because of the slow and critical operating conditions. In addition, such techniques do not achieve improved surface properties such as levelness, which are desirable for quality printing purposes.

The flint glazing technique has also been employed but, like the brushing method, its operation is extremely slow and requires highly critical controls. In addition the product has poor ink receptivity owing to the excessive quantity of wax lubricants which are necessary for the scouring action.

Attempts have been made to utilize conventional coating techniques with non-water absorptive resinous polymers, as would be desirable for many functional purposes. However, the utilization of non-water absorptive, resinous polymers in the production of finished papers especially adapted to receive print has not been satisfactory because the cost of these resins is excessive from the standpoint of justifying the use thereof in the coating weights normally required. Moreover, in the presence of substantial proportions of finely divided solid filler, i.e. mineral pigment or filler, required for good printability, such coatings have been marked by a defect known as "orange peel," this difficulty being attributed to the incapacity of the applied coating to flow properly. Perhaps the greatest disadvantage encountered with non-water absorptive resinous polymers in particulate form, however, has been the inability to attain adequate adhesion of the coating to the surface of the fibrous cellulosic substrate, with resultant failures in printing with high-tack inks due to delamination of coating from the substrate.

In accordance with the present invention there is provided coated paper having a finished print-receptive surface comprising a fibrous cellulosic substrate having bonded to at least one surface thereof a visually continuous, microporous, print-receptive film comprising a major weight proportion of finely divided solid filler adhesively secured by a minor weight proportion of at least partially coalesced, non-water absorptive resin particles bonding the filler particles together into a film. Because of the unique ink-receptivity of this film and for other reasons described hereinafter it is concluded that the resin particles incompletely fill the interstitial voids between the particles of solid filler to thereby provide a microporous film. This film is bonded to the surface of the substrate with a strength at least sufficient to resist the delaminating forces between film and substrate surface imposed by the high speed application of high tack printing inks. Indeed, with cellulosic substrates of conventional strength, the strength of the bond between the print-receptive film provided by the invention and the cellulosic substrate at least approximates and often far exceeds the internal strength of the substrate portion of the finished product. From the standpoint of structure, microscopic examination reveals that a plurality of cellulosic fibers of the substrate extend into and are securely anchored within the film.

Heretofore, when attempts have been made to employ many types of non-water absorptive heat softenable resin particles to adhesively secure together a major weight proportion of particulate filler, the resulting structure has been only superficially bonded to the substrate leading to a pronounced tendency toward the mentioned undesirable delamination particularly during the printing operation. To overcome this, the art teaches the expedient of resorting to soluble film-forming materials acting to supplement the inadequate interfacial bond between coating and substrate. These soluble film-forming agents interfere with the process of the invention and reduce the ink hold-out and ink receptivity of the film which is produced on the surface of the substrate. In contrast to this practice, the non-water absorptive resin particles employed according to the invention constitute the essential agent securing the film to the substrate.

In accordance with the new method provided by the invention, the product described hereinbefore is produced by passing through a nip defined between a pair of turning rolls—at least one of which has a heated finishing surface—a fibrous cellulosic substrate having on at least one surface thereof, a layer of a major weight proportion of finely divided solid filler in intimate admixture with a minor weight proportion of non-water absorptive, film-forming, heat-softenable resin particles. The surface of the substrate adjacent the layer of particulate materials is sufficiently wet with water to be permanently deformed by the application of pressure, the latter being evidenced by the unusual levelness which is achieved. Moreover, the exposed surface of the layer of particulate materials is dry to the touch. The exposed surface of the layer of particulate materials contacts the heated finishing surface as the substrate passes through the nip and the turning rolls apply sufficient heat and pressure to cause the resin particles to at least partially coalesce to incompletely fill the interstitial voids between the particles of filler to thereby provide the desired microporous ink-receptive film, an unusual improvement in levelness, and a secure bond between the film and substrate which resists delamination upon high speed printing with high tack inks.

The numerous advantages achieved by the invention are illustrated by the following.

The process itself is simple in operation, requires minimum controls and supervision, and can readily be performed either in conjunction with or apart from the substrate formation, i.e. the papermaking operation. In addition, considerable latitude can be exercised in the formulation and application of coatings for the process.

A further advantage resulting from practice of this invention is the creation of a firmly adherent bond between the surface of the substrate and the film of coating such that coating delaminations or "picks," as this phenomena is referred to in the industry, are not encountered in printing, particularly with high tack inks, i.e. low solvent, high viscosity, high adhesive inks. Irrespective of whether the substrate has been specially prepared, i.e., with dry strength additives, tub sizing, and the like, the strength of the substrate to coating bond will be such as to at least approximate, and normally far exceed, the internal strength of the substrate portion of the finished product. Moreover, the non-water absorptive coatings of the invention possess great internal strength in comparison with water absorptive coatings. Upon application, therefore, of a high shearing force, as encountered with printing, failures will not arise within the coating itself or at the coating-substrate interface. Instead, and even under severe conditions, failures in the products of the invention are characterized by the lifting of fibers along with any coating specks that may be removed. Significantly, this is in direct contrast to ordinary paper coatings of filler and water absorptive adhesives which, invariably, are characterized by initial failures within the coating itself (or rarely at the coating-substrate interface). This is also in contrast with prior paper coatings which employ filler and non-water absorptive adhesives which, as is well known, are characterized by failures at the coating-substrate interface. Furthermore, as opposed to the case with ordinary paper coatings, the unique film coatings of this invention, i.e. having great internal strength and being securely bonded to the substrate, permit the overall strength of the finished product to be retained more completely than is normally the case. Indeed, and in many cases, it will be found that the overall strength is actually increased. In contrast, prior treatments frequently result in a great decrease in overall strength, e.g., in excess of 50%, based on the original uncoated substrate.

Still another significant advantage of this invention involves the unique character of the coating surface in terms of its receptivity to inks and the like. The surface is characterized by a visually continuous, microporous film of coating which is readily receptive to printing inks applied by conventional techniques. The excellent ink holdout and print characteristics permit reductions in ink consumption up to 40% or more to obtain good solid colors, provide faster drying and set-up time of inks with virtually no set-off, and permit exceptionally fine screen work and halftone impression by virtue of finer dot definition. For offset printing, the extreme resistance to picking, as previously described, is a significant benefit. In addition it has been found that there is a reduced strike-in for protective varnishes and lacquers which therefore minimizes the quantity of these materials required and hence decreases the yellowing frequently encountered therewith.

From the standpoint of other properties, such as caliper, opacity and wet opacity—or opacity after thorough soaking in water—these are almost completely retained as compared to that of the substrate prior to coating. Although some loss in caliper can be expected as with any compression treatment, particularly where the substrate has a highly irregular surface, such losses are minimized by the process of this invention with attendant benefits in economics. Further, the utilization of a film-forming resin as a binder provides a surface which has a glass-like feel to the touch, is resistant to soiling and can be lightly sponged without surface mar. Where desired, gloss values approaching or surpassing those of cast coated paper can also be obtained.

In terms of economics and the outstanding surface properties which are provided, a valuable advantage of the method and product of this invention is that a level coating surface and fully covered substrate can be obtained by the use of relatively minor amounts of coating materials.

The foregoing indicates the presence of many advantages in specific instances but the listing is not exhaustive and numerous other advantages will become apparent from the description which follows taken in conjunction with the drawings in which:

FIGS. 8–11 are a plurality of photomicrographs taken at a magnification of 11.7× which illustrate the improved levelness and visually continuous film achieved in the invention. Thus:

FIGS. 8–11 are specifically related to the products used and produced in Example VII and these photomicrographs will be more fully discussed in connection with said example.

Figure 1:
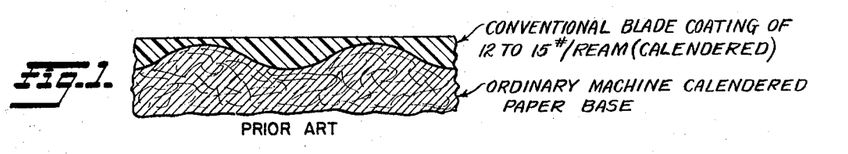
FIG. 1 is a diagrammatic partial view illustrating conventional coated paper.
Figure 2:
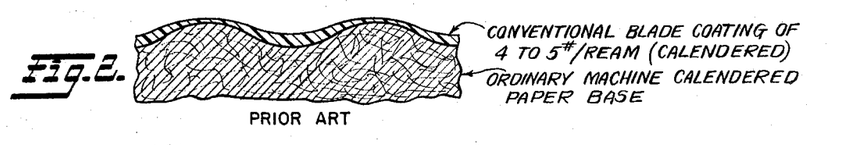
FIG. 2 illustrates diagrammatically what would occur in conventional practice if the coating weight were unduly decreased.
Figure 3:
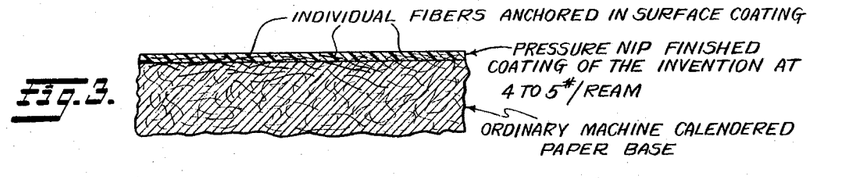
FIG. 3 illustrates the structure provided by the invention using low coating weights as are inapplicable in the conventional coating of paper for extremely level surfaces.

The significant characteristic of level coating surface with minor amounts of coating is clearly illustrated in FIGS. 1, 2 and 3 which schematically show a comparison of the product of this invention with products prepared by prior art techniques employing a variety of calendering and finishing treatments. In FIG. 1 there is depicted a conventional coating of approximately 12 to 15 lbs. per ream which has been applied to an ordinary machine calendered paper base. The cross-sectional view illustrates the characteristics of nearly all high quality printing papers including cast coated papers and in particular shows why it has been necessary to apply an excessive quantity of coating in order to fill in the valleys throughout the fiber surface so as to provide a smooth printing surface. The valleys, which define the surface volume of the paper, must be filled in to obtain maximum uniform ink receptivity. While other factors such as surface formation and the number of voids in the substrate also affect the surface volume, the latter is primarily a function of the surface irregularity from valleys and the like.

FIG. 2 depicts a conventional coating of only 4 to 5 lbs. per ream applied on an ordinary machine calendered substrate and subsequently calendered. It is characterized by only a partial filling in of the valleys of the surface, such that the entire surface remains considerably irregular and hence is unsuitable for quality reproduction requiring high resolution.

FIG. 3 shows a corresponding coated paper with approximately 4 lbs. per ream of coating and finished by the process of the invention. It is readily apparent that the 4 lbs. of coating per ream applied to the stock and finished by the invention herein disclosed has resulted in a combined leveling of the underlying surface of the stock in addition to the coating such that complete coverage of all fibers is assured and a visually continuous, microporous film is produced. As will be demonstrated hereafter, cellulosic fibers normally extend into the film which therefore may vary somewhat in thickness. The product is hence characterized by a printing surface which is particularly receptive to inks and which enables excellent resolution by any conventional printing method.

Considering first the attainment of the desired moisture condition for finishing, it has been found that there are in particular two preferred techniques for attaining the desired distribution of moisture within the coated web. The first involves a controlled "rewetting" technique with a previously coated sheet and the second involves utilizing "freshly applied" coating. As will be apparent hereafter, each technique has its particular operational advantages and, although some differences in properties can be obtained, the product will, in most cases, be nearly identical.

The rewetting technique according to this invention involves the application to a fibrous cellulosic paper substrate of an aqueous coating containing a major weight proportion of finely divided solid filler in intimate admixture with a minor weight proportion of non-water absorptive, film-forming, heat softenable resin particles. Thereafter the coated web is at least partially dried, as for example to the same extent which coated paper is usually dried on the paper machine. Following this, the coated surface of the substrate is remoistened as by applying water itself or by applying a further aqueous coating of finely divided solid filler and non-water absorptive, film-forming, heat softenable resin particles as hereinbefore described. Subsequent the coating layer is dried, i.e. subjected to an elevated temperature, to form an exposed coating surface which is dry to the touch. Simultaneously there is facilitated at least a partial drainage of the applied water content from the coating layer into the substrate to render the adjacent surface of the latter sufficiently wet with water to be permanently pressure deformable. Then as the resultant coated substrate is passed through a nip between a pair of turning rolls, wherein at least one of these rolls is provided with a heated finishing surface for contacting the exposed surface of the coating, the rolls apply sufficient heat and pressure to cause the resin particles to at least partially coalesce to incompletely fill the interstitial voids between particles of filler and at the same time cause pressure deformation of the substrate surface adjacent the coating-substrate interface.

The utilization of the rewetting technique has the particular advantage in that coatings can readily be applied on a paper machine without adversely influencing the speed of the operation. Since the paper need not be dried to the normal extent, increases in machine speed can frequently be attained. The paper can then be pressure finished in a separate operation when and where desired. Moreover, there is considerable latitude with respect to the weights of coating that can be applied to the substrate and also with respect to the ingredients of the coating. Where advantageous for certain purposes, this technique additionally permits the application of further coatings onto that initially applied, i.e. the latter in its uncompressed and unglossed state is readily receptive to such additional applications.

The technique involving the use of freshly applied coatings permits the application thereof and subsequent pressure forming as a series of steps within a single operation. According to this technique, coating is applied to a cellulosic paper substrate as previously described. Thereafter, however, the exposed coating is dried, i.e., subjected to an elevated temperature, to form an exposed coating surface which is dry to the touch and to simultaneously facilitate at least partial drainage of the water content of the coating layer into the substrate. By reason of the latter, the surface of the substrate adjacent the coating becomes sufficiently wet with water to be permanently pressure deformable. The resultant coated substrate is then passed through a nip between a pair of turning rolls, at least one of these rolls being provided with a heated finishing surface for contacting the exposed surface of the coating. Together the rolls apply sufficient heat and pressure to cause the resin particles to at least partially coalesce to incompletely fill the interstitial voids between particles of filler and also permanent deformation of the surface of the substrate adjacent the coating substrate interface.

Thus it is apparent that the process lends itself to utility in a variety of ways, i.e., at a single location or several locations, and can be performed as an adjunct to the papermaking process, as a separate converting operation or in any combination of these two techniques.

Regardless of which technique is employed, in a preferred embodiment the moisture of the coated substrate immediately prior to entering the pressure nip is so provided that the exposed surfaces are each dry to the touch whereas the surface of the substrate adjacent the layer of coating is moist. That is, not only is the exposed coating surface dry to the touch but, in addition, the reverse or uncoated side of the substrate is also dry to the touch at its exterior although the moisture content of that portion of the subtrate adjacent the coating layer is substantial. By thus confining the majority of moisture in the substrate to that portion adjacent the interface, any losses of opacity and caliper resulting from the compression are minimized. Stated differently, permanent deformation of the substrate is largely confined to the water-plasticized portion underlying the coating to provide maximum leveling with minimum overall compression.

By either of the above technique, coating is readily applied to the substrate by any of the conventional on-machine or off-machine procedures. In any case, however, it is preferable to use a coater in the nature of a doctoring device since this permits relatively low coating weights to be applied without substantial penetration of the stock. Since the solids content of the coating composition is composed essentially of water-insoluble material, a filter cake of finely divided particles quickly results following the coating application. Hence the substrate effectively screens out the pigment and resin with only water penetrating into the substrate.

Following the application of coating for use in the rewetting technique, the resulting coated substrate is dried by any of the well known procedures employing either festoon driers, hot air driers, or heated drier rolls. It is preferred, however, that the heat applied to the coating fo drying not be so great as to cause substantial fusion of the resin particles thereof. The resulting moisture content of the entire sheet can be that which is normally characteristic of dried paper, approximately 4% or less, although it is entirely practical to retain a considerably higher quantity of moisture therein provided it is not so excessive as to interfere with subsequent handling. Thereafter the coated substrate is simply remoistened by water which is applied to the exposed coating layer. Since the coating is substantially porous owing to its particulate, non-gelled structure, a portion if the water which is applied readily drains therefrom into the adjacent surface of the substrate. The coating layer is then heated to remove water at its exposed surface to render that surface dry to the touch. The latter condition is therefore a result of some additional drainage of water from the exposed coating surface, and to some extent, partial volatilization of water at that surface.

For the application of coating to be followed by finishing in a unitary process, moisture in the surface of the substrate adjacent the coating is provided by direct adsorption of the aqueous phase of the coating composition into the substrate. In the same manner as described in the preceding paragraph the exposed surface of the coating layer is heated to render it dry to the touch.

By either technique therefore the coated substrate as it enters the pressure nip comprises a fibrous cellulosic substrate having particulate coating on at least one surface thereof, the exposed portion of the coating surface being dry to the touch and the surface of the substrate adjacent the coating being wet with water to be permanently pressure deformable.

Indications are that within the nip several phenomena are occurring simultaneously. In the first phase the particualte layer of coating having a non-adherent surface which is dry to the touch is pressed and molded against the finishing roll such that the resin particles are at least partially coalesced under heat and pressure to incompletely fill the interstitial voids which exist between particles of mineral filler and thereby provide a microporous film. The production of a visually continuous film comprising non-water absorptive resin which is penetrable by water attests to this phenomena. At the same time the moist surface of the cellulosic substrate adjacent the substrate-coating interface is in effect plasticized with water so that under pressure it is flattened and leveled. The flatness of the finished product achieved with minimum reduction in caliper attests to these two phenomena. In addition, the presence of moisture at the substrate-coating interface together with the applied temperature and pressure provides a localized chemical plasticization of the cellulosic substrate and a mechanical turbulence establishes a firmly adherent bond between the coating and substrate. The resulting finished coated substrate emerges cleanly from the nip under tension without separation of the coating and substrate layers while the release of the compressive forces which have acted on the composite coating and substrate produces a rapid reduction in the moisture content of the product by flash vaporization such that the resulting product is essentially dry and can be used immediately.

A further description of the present invention will be made in connection with FIG. 4 which is a simplified diagram illustrating the steps of the process as utilizing freshly applied coating in a unitary process as distinguished from the rewetting alternative which will be readily understood as a mere variation in manipulative steps. As shown therein, a paper substrate 11 is led from unwind roll 10 and over guide roll 13. The substrate is then wrapped about a pair of rolls 16 and 17 which are a part of a conventional calender stack 15 that also serves as a finishing unit for the subsequently applied coating. Although passage of the substrate, while still uncoated, into one or more nips is unnecessary, it serves as a convenient means for adjusting the tension, particularly for high speed operations. The substrate 11, still uncoated, exits from the calender stack, passes about guide rolls 19 and 20, and then to coater 25. A particularly advantageous coater for high speed operations is that depicted which comprises an applicator roll 27, turning in either direction as desired and dipping in a pan 28 containing coating 26. Excess coating applied to the substrate is doctored off by any suitable doctoring device such as a mounted rotating rod 29 which is preferably driven in the same direction as the substrate. The coated substrate then passes under guide roll 30 which serves to adjust the degree of wrap about doctor blade 29. Prior to entering the nip, the web is subjected to any convenient source of heat, illustrated in the drawing simply as a bank of infrared lamps 35 which may be supplemented by a reflector 36 on the opposite side of the moving substrate. Desirably such heat is directed toward the coated side to implement drainage of water into the substrate, evidently by capillary action, while forming a layer of substantially dry particles of coating thereon. Although such drainage can be obtained without the application of heat to provide a surface which is dry to the touch, e.g. by providing a substantial distance between the coater and nip, this is less advantageous in that the process must be operated more slowly and, since the moisture will permeate throughout the entire substrate rather than being confined to the portion of the substrate adjacent the coating, excessive losses in opacity and caliper will be encountered. The quantity of heat desirably directed toward the coated substrate, either rewet or freshly applied, during the intermediate surface drying step, as for example by the infrared lamps 35 in FIG. 4, should be sufficient to quickly diminish the moisture content of the exposed coating surface and form a somewhat non-adherent skin which is dry to the touch. Hence, the application of heat should be sufficient to raise that surface temperature to at least 175° F., and preferably to at least 190° F. to promote the rapid formation of the skin and permit practical operating speeds of 200 or more lineal feet per minute. It will also be noted that since some volatilization of moisture is continuously being effected, the coating surface prior to entering the nip will not ordinarily exceed the boiling point of water.

After removal of a portion of the water contained in the coating, both by drainage and partial evaporation, to leave a substantially non-fluid or immobile, pressure-deformable layer or residue with a non-adherent surface which is dry to the touch, the substrate passes into the nip 40. The coated side is pressed into contact with roll 44 which is usually a metal roll, internally heated, provided with a finishing surface such as a smooth hard exterior of polished chromium or the like. The rolls are driven by any suitable means, not shown, in the same direction and at a surface speed equal to the lineal speed of the coated substrate itself, usually at least 200 feet per minute and ordinarily 400–1000 feet per minute.

As will be apparent, utilization of the rewetting technique involves substantially the same arrangement as described above in connection with FIGURE 4, except that the coater 25 applies water to the moving coated surface rather than fresh coating. Alternatively, or in addition, water or steam showers may be used to moisten the coated web from the coated side. It is important that before the application of water, the coating contained on substrate 11 not be fused to an extent which markedly reduces the capacity of water to pass rapidly through the coating, i.e. calendering of the coated substrate prior to rewetting should either be avoided or at least employ moderate temperature and pressures.

As shown and as is preferred, the coated substrate passes directly into the nip 40 rather than first contacting either of the rolls 44 or 39 alone as would be the case if it enters the nip at an angle. Such a preferred arrangement serves to impart greater levelness to the coating and to the substrate surface adjacent the coating. Evidently passage directly into the nip tends to promote a greater relative slip within the underlying portion of the coating and plasticized portion of the substrate with the consequence that the materials thereof are exposed to a greater shearing force and, hence, greater leveling action. Such a shearing force is not as effectively provided if the substrate wraps about a significant portion of the circumference of either of the nip rolls prior to entry into the nip itself. Moreover, although the surface of the coating layer is dry to the touch at this stage, some undesirable adherence to the finishing roll may be encountered if the coating surface contacts the finishing roll before it is subjected to the nip conditions.

The coated substrate then exits from the nip 40, passes under tension about guide rolls 41 and 42 and is wound up on roll 49. The release of the extreme compression exerted within the nip upon the water in the coated substrate causes a rapid or flash volatilization thereof immediately upon exit from the nip. In most cases the coated paper substrate will be sufficiently dry to permit its use without a further drying treatment. For the same reason as above mentioned, namely increased shear, guide roll 41 is preferably so arranged that the coated substrate exits from the nip so as to substantially immediately be removed from contact with finishing roll 44, although it is possible for many purposes to permit the coated substrate to wrap about a portion of roll 44 after exit from nip 40 with or without entry into further nips. In most cases therefore, superior results are achieved when the coated substrate contacts finishing roll 44 only within the nip itself.

To prevent a metal to metal contact between rolls to avoid damage to the surface of the finishing roll, and to increase, slightly, the effective area of the nip 40, it is desirable that back-up roll 39 have an outer layer of material such as pressed cotton, nylon, asbestos or rubber which, although relatively hard, has some resiliency in comparison with the finishing roll.

Where maximum gloss values for purposes of appearance and the like are desired, the coated substrate after exit from nip 40 can be subjected to further calender nips with or without metal surfaces that may be polished and/or heated as desired.

It will be apparent that there are a number of factors which have a bearing upon the ultimate levelness which is imparted to the coated substrate within the nip. A direct relationship can be established between the temperature of the finishing roll 44, the extent to which it may be polished, the pressure existing between rolls 39 and 44 and the cross-sectional area of the nip, i.e. the diameter of rolls 39 and 44 or the relative resiliency of roll 39. The thickness of coating, the type and softening point of the resin, preparation or previous treatments of the substrate, and the quantity of water remaining in the coated substrate following the surface drying also have an effect upon the ultimate degree of levelness that can be imparted.

In general, the temperature of the finishing roll should be in the range of 140° to 350° F. and the nip pressure in the range of 1500 to 7500 pounds per square inch. Particularly preferred, however, is the range of 3300 to 6000 pounds per square inch since this provides the greatest latitude in selecting the other process variables. Although nip pressures as great as 10,000 p.s.i. and as low as 500 p.s.i. can be tolerated, they require critical adjustments of other variables and hence are less satisfactory for maximum operating efficiency.

Depending upon the above mentioned factors and whether fresh or previously applied coating is employed, the speed of the operation may be 200 to 1000 or more lineal feet per minute. It is not unusual that a product obtained at speeds in excess of 400 lineal feet per minute will be superior in terms of optical and strength properties to that produced under the same conditions but at a lower speed where smaller quantities of moisture are present in the coated substrate upon entry into the nip.

Variations of the above factors make possible a great number of modifications of operating techniques depending upon such factors as the type of available equipment, the type of product and properties desired, and the economics involved. Thus the only required features of any apparatus to be so used is a means for applying coating, further means for adjusting the subsequent water content thereof during the finishing phase and a pair of rolls, at least one of which is provided with a finishing surface.

Although the process has mainly been described with reference to an off-machine application as would be conveniently performed on a supercalender, it will be apparent that for increased economical advantages the method is readily adapted to an on-machine operation. In still other modifications it is entirely practical and, in fact, desirable for higher production to increase materially the width of the nip by employing nip rolls of a diameter beyond the ordinary size of 8 to 20 inches. Alternatively, the finishing roll alone may be increased in size.

Where a coated two sides sheet is desired, it is entirely practical to coat the reverse side of the substrate by identical or other procedures either as a unitary process or not.

Because of the relative high cost of the resin binder and owing to the nature of the leveling process, it is desirable that low weights of coating be applied and, preferably, at high speeds. It has been found that there is little to be gained by the use of coating weights in excess of 9 pounds per ream dry and, for most purposes, 6.5 pounds per ream or less will satisfactorily provide the desired surface characteristics. Convenient techniques for adjusting the quantity of coating applied to the substrate involve regulation of the solids content of the coating, the speed of the coating operation, the diameter of the doctor rod, and the pressure exerted by the doctor rod 29 in wiping excess coating from the substrate. These techniques are known and need not be explored in detail herein.

Figure 4:
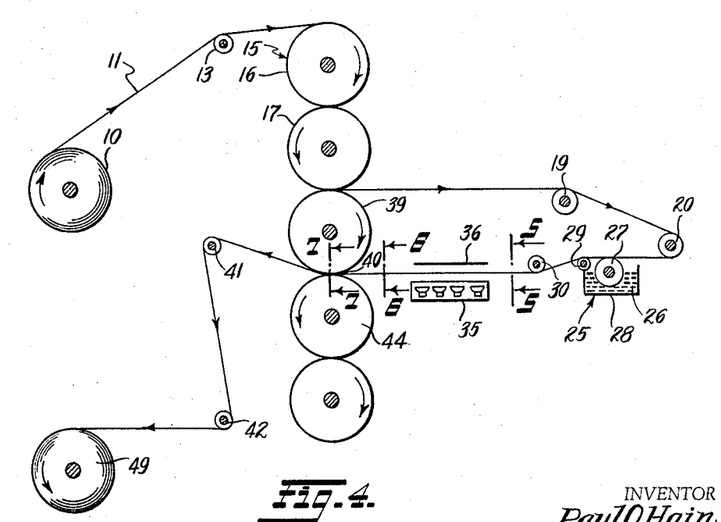
FIG. 4 is a diagrammatic view illustrating the process of the invention.
Figure 5:
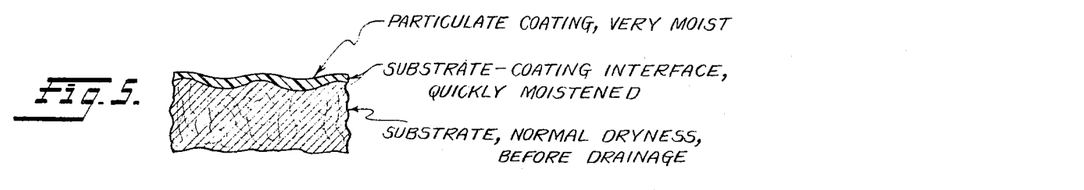
FIG. 5 is a diagrammatic view taken generally along the line 5—5 of FIG. 4.
Figure 6:
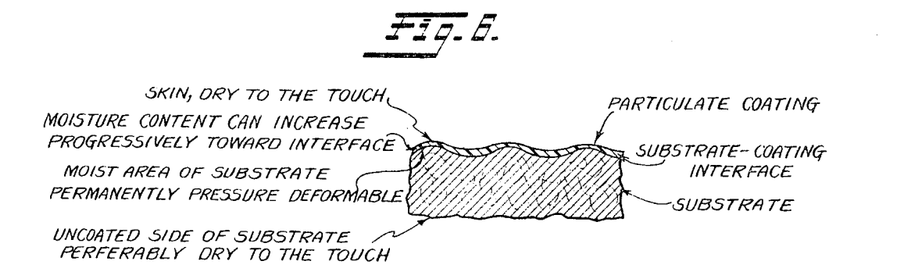
FIG. 6 is a further diagrammatic view taken generally along the line 6—6 of FIG. 4.
Figure 7:
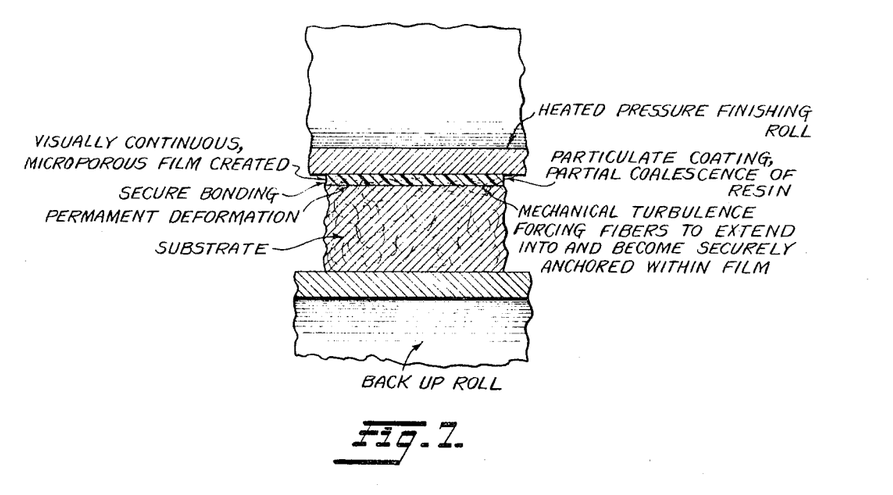
FIG. 7 is another diagrammatic view taken along the line 7—7 of FIG. 4.

By way of further explanation of the invention, FIGS. 5, 6 and 7 diagrammatically depict the distribution of moisture within the coated substrate at various intervals of the process. Thus FIG. 5, in a view generally on the line 5—5 of FIG. 4, illustrates the coated substrate just as coating is applied at the coater, whether for immediate use thereafter or for drying, storage in roll form, and subsequent rewetting. As shown, coating on the surface of the substrate is in a moist and mobile condition and is approximately at the same solids content as it was before application. The substrate at this point is substantially dry or at least has the moisture content of a normal substrate stock, i.e. 4% by weight or less.

In FIG. 6, which is a view generally on the line 6—6 of FIG. 4, the coated substrate surface, either after rewetting or after fresh application, is shown at the time it is ready to enter the pressure-nip. The coating layer has an exposed skin which is dry to the touch; that is, has a non-tacky exterior which is non-adherent to the finishing surface under the conditions existing within the nip, while below this skin the moisture content can increase progressively to the substrate-coating interface. Some moisture within the coating itself and below the skin serves to increase the flow or mobility of that portion, evidently a result of a plasticizing effect, during the action of the pressure nip which follows. Because of this mobile condition additional conformity is promoted to the finishing surface over that amount which would be obtained with a totally dry coating. Of significant importance, however, it will be seen that immediately adjacent the interface, the substrate contains a substantial amount of moisture which has been absorbed from the coating layer. The moisture content of the substrate may, and generally does, decrease progressively toward the opposite surface of the substrate which is uncoated and usually is substantially dry.

FIG. 7 is a view of the line 7—7 of FIG. 4 and shows the action occurring within the nip; that is, under the conditions of compression and elevated temperature which exist between the two rolls. The layer of coating having an exposed non-adherent skin which is dry to the touch is readily molded against the finishing roll. The resin particles partially coalesce or fuse with the filler particles to incompletely fill the interstitial voids between the latter. At the substrate-coating interface, a firmly adherent bond is provided between the substrate and the resin constituent of the coating layer and this bond, combined with tension from a guide roll beyond the nip exit, overcomes any tendency of adherence of the coating to the finishing roll. As a consequence, the coated product separates cleanly from the finishing roll. Also within the nip deformation occurs at the portion of the substrate immediately adjacent the layer of coating. Thus the cellulose fibers, which have become softened or plasticized by the combination of moisture and heat, are also molded in conformity to the finishing surface and a flattened appearance of many surface fibers partially surrounded by coating can readily be discerned. As a consequence of this action, leveling of the underlying surface of the stock is accomplished such that virtually complete coverage of each fiber can be attained with a minimum quantity of coating material. The decrease in moisture content from the interface toward the uncoated side accounts for minimum losses in opacity and caliper. Although some decrease in these can normally be expected as with any pressure treatment, such as a calendering operation, the process of this invention minimizes such losses.

From the foregoing it is apparent that at the moment of entering the nip, the moisture content of the coated substrate and its distribution therein are of considerable importance. By suitable regulation of these through manipulation of variables such as operating speed, finishing roll temperature, nip size, etc., the proper balance can be achieved between release from the finishing roll, moldability of the coating and the substrate surface immediately adjacent thereto, and bonding between coating substrate consistent with the attainment of the desired surface properties of the product. Although the mechanical limitations of making such measurements preclude the establishment of precise numerical values, some indication of moisture content and distribution is obtainable by relating such factors as initial moisture in the substrate, quantity of the coating applied and its solids content, the quantity of heat applied and moisture evaporated in the intermediate drying stage, and the total moisture content of the coated substrate as it passes into and out of the nip. In general, the proper nip conditions can be established under conditions where the total moisture content of the coated substrate as it enters the nip is between about 3 and 15% by weight, preferably between about 4 and 10% by weight, and the moisture content of that portion of the substrate surface immediately adjacent the coating is at least 15% and preferably 20% by weight or more. Similarly the exposed skin of coating which is dry to touch should not contain more than about 10% by weight of water, preferably no more than about 5%, as it contacts the finishing roll. The amount of water at the uncoated side of the substrate is determined largely by the relative cross-section of the substrate and by its initial moisture content before application of coating or rewetting liquid, usually about 4% or less. An excessive moisture content within the substrate itself, i.e. over 10%, serves no particular advantage since it materially reduces the rate at which water from the coating layer will drain into the substrate. While these conditions do result in the attainment of the desired characteristics in the finished product, the process should not be construed as limited thereto since, as has been stated, these conditions are only indicative of the nip conditions which cannot be definitely fixed with preciseness by existing equipment.

The fibrous cellulosic substrates to be coated in accordance with the invention can be of wide variety depending upon the use for which the product is intended. Thus they can be uncoated, coated, or sized webs, of either bleached or unbleached stocks, and can vary in weight from lightweight papers to heavier paperboards. For purposes of moisture drainage it is necessary that they be of a somewhat porous character. For example, paper which has simply been tub-sized with an unpigmented starch or protein composition for increased internal strength provides a particularly suitable substrate for application of the coatings of this invention. Too, substrates which have been previously coated, whether the adhesive therein is water absorptive or not, can be be used to advantage since the stock is partially filled in such that less coating need be applied by the process of the invention to achieve the visually continuous, microporous print-receptive film. For magazine papers and the like where weight is of particular concern for reasons of economics, a comparatively light weight stock of 45 pounds per ream or less can readily be coated by the method of this invention to provide a highly useful printing paper of minimum weight. It is to be understood that the term "fibrous cellulosic paper substrate" is inclusive of those non-woven substrates which are wholly cellulosic and those containing, in addition, non-cellulosic fibers, whether natural or synthetic.

Where low weights of coating are to be applied in accordance with this invention, the formation and manufacture of the substrate is of considerable importance in attaining a finished product having the desired optical properties such as opacity, brightness and the like. Such low weights of coatings, even though they contain substantial proportions of filler, will be so thin that optical properties, other than gloss, are only moderately affected. Thus the invention provides a unique versatile printing surface which maximizes the utilization of the original optical properties of the substrate.

Depending upon the initial substrate employed and the conditions of the coating and finishing operation, optical properties of gloss, brightness, opacity can vary widely. With a polished chromium finishing surface, gloss values of at least 50 and often 80 or more are readily attained. With other finishing surfaces such as steel or dull finished chromium these values may be somewhat lower. Brightness will be essentially unchanged from that of the rawstock, usually at least 70 for printing papers, unless coloring agents are incorporated in the coating. Opacity values for the finished product will approximate, within a few points, of that of the rawstock although this depends largely upon the nature and proportion of solid mineral filler. Again for printing purposes, such values are ordinarily in excess of 80.

Whereas smoothness values for many printing papers exceed 75 and often 100 or more, the products of this invention commonly have values below 50 and most often below 30 such that exceptionally high quality resolution is provided upon printing. While the caliper will be somewhat effected by the compression, particularty with irregularly surfaced substrates, the bulk value of the coated finished product, in terms of the number of sheets to yield a given thickness, will usually only moderately exceed that of the uncoated rawstock, i.e. often by 30% or less.

The aqueous coatings applied to the cellulosic paper substrates contain as ingredients of the dispersd phase, an intimate admixture of a major weight proportion of finely divided solid filler together with a minor weight proportion of non-water absorptive, film-forming, heat softenable resin particles. As the latter component, synthetic resinous thermoplastic polymers of one or more ethylenically unsaturated monomers are particularly preferred and examples of these include polyvinylidene chloride, polyvinyl chloride, polyvinyl acetate, copolymers of viny chloride and vinylidene chloride, polyethylene, copolymers of alkyl esters of acrylic and methacrylic acid with one or more monomers such as acrylic acid, methacrylic acid, vinyl acetate, vinyl chloride, etc. These and other suitable polymers are characterized as being substantially non-rubbery, flexible, heat softenable resins which provide a tenacious bond between particles of solid filler and are readily coalesced under the pressure nip conditions according to this invention to form a visually continuous, microporous, print-receptive film. Mixtures of different polymers can often be used with advantage to achieve particular combinations of properties. Desirably the second order transition temperature of the polymers should be in the range of 5° F. to 176° F. and preferably the polymers should have softening points sufficiently high that as such they do not coalesce at room temperature under normal pressure but sufficiently low that they are readily softened at the temperature and pressure of the finishing roll. The polymers are employed in the form of latices or dispersions in water, ordinarily these may be in the range of 30 to 70% total solids, a form in which many are available commercially or can be prepared by known emulsification techniques. If desired the film-forming polymers may be replaced in part, i.e. up to 50% by weight, with rubbery polymers such as copolymers of styrene with butadiene and copolymers of acrylonitrile with butadiene with or without styrene. Such rubbery materials should be non-water absorptive and be present in a particulate form. The resin particles constitute the essential ingredient for securing the resulting film to the substrate.

Especially suitable finely divided solid fillers are the mineral pigments or fillers, for example clay, calcium carbonate, titanium dioxide, zinc oxide and the like. Mixtures of these can be employed with advantage.

In a preferred embodiment of the invention the finishing surface can be provided with a molten deposit of a waxy lubricant to reduce the tendency of portions of the coating layer to adhere thereto. Particularly this is advantageous when the finishing roll has a temperature in excess of about 220° F. or where relatively low quantities of the resin adhesive are used. One means to readily provide such a deposit and to continuously replenish it is to include the waxy lubricant in particulate form directly in the coating composition. In this way the lubricant remains as a finely divided solid or as fluid globules until contacted by the elevated temperature and pressure conditions existing in the nip. Hence during the coating operation and intermediate surface drying step the lubricant remains substantially inert in its particulate form and does not interefere with the drainage of moisture into the substrate as would be typical of water absorptive materials. However, once the elevated temperature and pressure conditions in the nip are exerted upon the lubricant, it is caused to flow to thereby create a layer of such lubricant between the finishing surface and the coating layer.

The foregoing lubricants, particularly if included in the coating composition, should have a softening point below the surface temperature of the finishing roll, i.e. at least below about 350° F. Desirably, the melting point should be in the range of 100° to 250° F. with the range of 140° to 200° F. being particularly preferred for effective high speed operations. Advantageously the lubricants are employed as aqueous emulsions of finely divided waxy material which, in comparison with the resin particles, is non-film forming. Particularly preferred materials are those of a polar character such as the high melting sugarcane waxes and oxidized hydrocarbon waxes which appear to form an adherent physical or chemical bond with the finishing surface to provide a more stable layer, usually visible, of lubricant.

For effective utilization of a lubricant, it should in general constitute about 0.5 to 15% by weight of the total solids content of the coating. Lesser quantities than those specified ordinarily fail to reduce adhesion to the desired degree while higher amounts can result in a waxy appearing surface of decreased ink receptivity. Also, the presence of excessive quantities of lubricants tends to decrease fusion of the thermoplastic adhesive such that a visually continuous surface may not be readily obtained. Advantageously then, for the best balance of release, superior coating properties, and increased stability of the coating emulsion, the proportion of lubricant is in the range of 1 to 8% by weight based on the total solids content of the coating.

The aqueous coating compositions used are readily formulated by simple mixing procedures well known in the art and of no material significance insofar as this invention is concerned.

The ultimate choice of the total solids content will depend upon such matters as the coating weight desired, the surface properties to be imparted, the coating rheology and the type of coater to be employed. In most cases the range of 35 to 70% by weight total solids permits a proper balance of those factors to be achieved. For high speed operations the range of 45 to 60% is especially preferred since coating viscosity is at an optimum, the water content is moderate, and low weights of coating can readily be applied.

The relative proportions to be employed of the particulate ingredients of the coating will depend primarily upon objectives of print receptivity, satisfactory bonding of the film to the substrate and upon the economics involved. A total solids content composed of 60 to 90% finely divided solid filler, 10 to 40% resin particles and 0 to 15% lubricant, all on a dry weight, satisfactorily achieves those objectives. A preferred proportion, however, utilizes 70 to 88% filler, 12 to 30% resin particles, and 0 to 8% lubricant to achieve maximum properties at minimum expense.

Aside from the hereinbefore described ingredients of the aqueous coating compositions, namely the particulate filler, resin particles and lubricant, it is entirely practical and often desirable to include certain additives, for example dyes, plasticizers, viscosity regulators, dispersants for the lubricant, etc. Preferably the coatings should, however, be substantially free of monomeric or polymeric materials of a water-soluble or water-absorptive nature such as proteins. If present for one reason or another, however, they should be chemically modified or otherwise not be in such proportions as to create a gelled structure which will either impede drainage of water into the substrate or prevent rapid and complete release from the finishing roll. By formulating the coatings almost exclusively of finely divided material dispersed in water as the continuous phase and keeping the quantity of water-soluble or water-absorptive materials at a minimum, i.e. less than 5% by weight of the total solids and preferably less than 1%, rapid drainage of water into the sheet is readily facilitated and the characteristic ink holdout is obtained.

Depending upon the technique employed, it must be pointed out that other means can be provided for effectively utilizing lubricants to reduce the tendency of portions of the coating layer to adhere to the finishing surface. For example, rather than including such in the coating they can be applied to the finishing roll or even to the coating surface directly, for example by a steam shower, water shower, or soft applicator roll. Where the rewetting technique is to be employed, the lubricant can be provided in the aqueous rewetting liquid.

The ink receptive character of the product of this invention is a result of its unique visually continuous, microporous film of particulate filler adhesively secured by at least partially coalesced, non-water absorptive resin particles which incompletely fill the intersticial voids between the particles of filler. The film is visually continuous in that the naked eye and even low power magnification, e.g. 6 to 10×, reveals a continuous film having few, if any, holes or other surface deformities. In other words the microporisity is not visible under low magnification or even under high magnification. By virtue, however, of the film's microporous and non-water absorptive nature, ink is readily retained by the coating, despite optimum ink holdout, providing effective high speed ink receptivity, excellent resolution and the important economy in the consumption of costly inks.

As previously indicated, microporosity is established by the usual ink-receptivity which is obtained from high speed printing with high tack inks upon a visually continuous film of non-water absorptive resin which, in the form of an ordinary resin sheet would not be satisfactorily printable in the manner indicated. Microporosity is further indicated to have been achieved by the capacity of water in liquid form to seep or otherwise move in bulk through the visually continuous film as is illustrated by the fact that Graff's "C" Stain (containing zinc-chlor-iodide) placed as a drop upon the film causes the underlying cellulose fibers, particularly those covered by less than about one micron of film, to become stained in about one minute.

The invention achieves excellent ink-receptivity in combination with unusual ink hold-out with remarkably rapid set-up to provide a virtually set-off free printed product. Thus, the printing ink is well received by the visually continuous film, there is very little migration of ink solids away from the surface of the coating and despite these facts, the ink sets rapidly so as to resist set off. The combination therefore enables substantial economies in terms of printing ink consumption and the rapidity of the printing operation. At the same time, these divergent phenomena further establish the microporous nature of the visually continuous film.

The size of these tiny porosities, which are invisible under low magnification, is further established by the unusual action which takes place when the coated sheet is varnished. Normally, the varnish would be partially absorbed into the paper through whatever surface coating was present thereupon. In the invention, smaller proportions of varnish are required to form a continuous film thereof because, apparently, the microporosities in the film resist the passage therethrough of the high molecular weight fragments constituting the vehicle of the varnish.

Heretofore it has been characteristic that the ink receptivity of water absorptive paper coatings ordinarily varies somewhat across any given surface such that a slightly mottled appearance can be discerned upon printing of continuous tones. This is a consequence of non-uniform penetration of the adhesive into the substrate; i.e. either the adhesive is hydrophilic and has partially drained into the stock with the water, or else such is a result of purposeful impregnation of the stock by the particular coating applicator used. For this reason it has been common practice that allowance be made during the coating preparation for the quantity of adhesive that will drain into the stock. By the method of this invention, however, the surface of the coating is a unique microporous film which is uniformly ink receptive. As a result the mottling problem is essentially overcome.

Microscopic examination indicates that the resistance of the film to delaminate from the substrate is, at least in part, a result of individual cellulosic fibers extending from the substrate into the coating film where they are securely anchored by the at least partially coalesced resin particles. As a consequence the film may vary in thickness from a fraction of a micron to several microns, e.g. 5 or more. The bonding of fibers in this manner, rather than a mere reinforcement as provided by ordinary water-absorptive adhesives, does not appreciably detract from the strength of the substrate and in most cases will significantly add to it.

In the following examples and elsewhere in the specification, test data was obtained by the following:

*Gloss*—Instruments and procedures as specified in TAPPI method T42m–52, Contrast Gloss of Paper at 57.5°.

*Opacity*—Instruments and procedures as specified in TAPPI method T425m–60, Opacity of Paper.

*Brightness*—Instruments and procedures as specified in TAPPI method T452m–58, Brightness of Paper and Paperboard.

*Bulk*—Test measurements made using a Perkins "Pressure Bulker," to determine the number of sheets comprising an inch of thickness when under 35 pounds pressure.

*Smoothness*—Test measurements made using a Sheffield "Precision Aire" Paper Smoothness Tester, Instrument Model No. 159–55.

*Tack*—Test measurements for failure points were measured using: an "I.G.T. Printability Tester" manufactured by the Instituut Voor Grafische Techniek, with a rate of shear in the range of 0–200,000 reciprocal seconds (the "B" scale), essentially Newtonian inks of a viscosity of 25 to 28 gram meters as measured on the Litho Technical Foundation Inkometer, with essentially constant conditions of temperature (ambient) and printing pressure (50 kg./cm. of printing line). The results are reported as Velocity in ft./min. at the point of initial failure. The type of failures characterized are heavy stock failures resulting in complete separation of the stock internally. Measurements were made on the normally stronger cross direction (CD) rather than machine direction (MD) unless otherwise indicated.

The invention will be further described with reference to the following examples wherein all parts are by weight unless otherwise stated. Therein and elsewhere in the specification the word "ream" refers to 500 sheets of paper 25 x 38 inches—thus 3300 square feet of surface.

EXAMPLE I

The rewetting technique was performed by applying coating on the paper machine with rewetting and finishing in a separate operation.

Resin coating was applied on a Fourdrinier paper machine at 520 feet per minute by means of a coater as depicted in FIG. 3 of U.S. Patent 2,729,192 using a ¼" diameter doctor rod. The paper substrate weighed 54 pounds per ream and had a preliminary tub size application of starch.

The coating contained the following, parts given on a dry weight basis:

| | |
|---|---|
| Parts of clay | 100 |
| Parts of a copolymer of 60% vinyl acetate with 40% ethyl acrylate (43% total solids emulsion) | 20 |
| Parts of wax blend of (a) non-saponifiable petroleum wax,[1] softening point 195–200° F., penetration value (100 g./5 sec./77° F.) of 0 to 3, with (b) sugar cane wax (softening point 176–178° F.), and (c) paraffin wax, softening point 138–140° F.; the blend, in the ratio of 6:1:6, was emulsified to yield a 25% total solids aqueous dispersion, water to 51% total solids | 3 |

[1] Waxes of this type are available commercially, e.g., "Polymekon" wax.

An average of 5.0 pounds of coating per ream was applied to the substrate with the resulting product, identified as A, having been dried against the heated metal drying drums of the paper machine to a moisture content of about 3% and wound up in rolls.

For rewetting, the apparatus of FIG. 4, was employed with roll 27 metering water from pan 28 onto the coating layer and the excess being doctored off by rotating doctor rod 29, diameter ¼", to leave approximately three pounds of water per ream. At a speed of 300 lineal feet per minute the substrate, having a moistened layer of coating, was subjected to a bank 35, of infrared lamps to render the coating layer dry to the touch. The sheet then passed into and out of nip 40, being finally wound up again in roll form. The lamps had a power input of about 45 kilowatts and the heat was directed toward approximately 12 square feet of coating surface. Back-up roll 39 was a hard pressed cotton fiber roll and finishing roll 44 had a diameter of 12 inches, a polished chromium surface, and was internally heated to a temperature of 240° F.

The pressure exerted within the nip, having a cross-sectional area of 0.25 inch, was 4500 pounds per square inch.

The results of the foregoing procedure according to this invention and identified as B was compared to:

(C) Identical procedure as with B except that the coating layer was not remoistened prior to entering the pressure nip, i.e., the coated substrate did not contain sufficient water, (D) Same as C except that the bank of lamps 35 was not employed, and (E) The coated surface of unfinished sheet A was remoistened by a small spray of water immediately prior to entering the nip to duplicate the effect of moistening by a water box on a conventional calender unit, i.e., virtually no drying of the applied moisture before entering the nip. Other nip and operating conditions were the same as with the preparation of sample B.

The results were as follows:

|  | Gloss | Opacity | Brightness | Bulk | Smoothness | Tack | |
|---|---|---|---|---|---|---|---|
|  |  |  |  |  |  | CD | MD |
| Uncoated Substrate (FIG. 8) | 6.3 |  |  |  |  |  |  |
| A (FIG. 9) | 9.5 | 91.1 | 80.4 | 226 | 259.4 | 543 |  |
| B (FIG. 10) | 82.2 | 87.9 | 76.7 | 348 | 27.6 | 608 |  |
| C (FIG. 11) | 57.0 | 89.8 | 79.2 | 318 | 38.60 | <200 | 360 |
| D | 60.0 | 89.9 | 79.1 | 310 | 64.4 | <200 | 360 |
| E | 60.5 | 92.1 | 77.6 | 332 | 30.8 | 145 |  |

The Tack test indicated that product B was totally free of coating picks; thus the values given represent internal failure of the substrate rather than failure of the coating or the coating to substrate bond. In other words, a disruption of the coating of sample B quite visibly removed cellulose fibers therewith.

Figure 10:
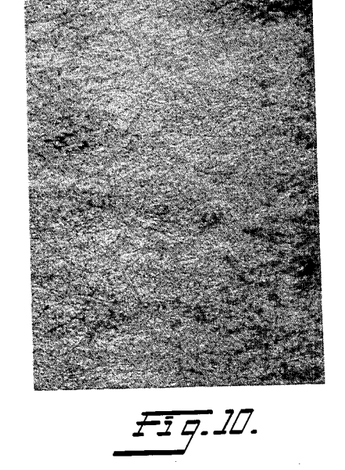
FIG. 10 illustrates the coated raw stock finished in accordance with the invention and showing the extreme levelness which is achieved and the substantial elimination of holes and other coating defects obtained despite the thinness of the coating.
Figure 11:
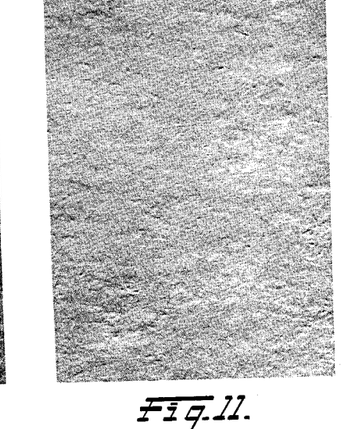
FIG. 11 is submitted for comparison with FIG. 10 to show the lesser degree of levelness and the greater extent of film discontinuity which is obtained when conventional dry calendering is employed in contrast with the teachings of the invention.

As indicated from the foregoing data, the gloss obtained by the product produced in accordance with the invention, namely B (pictured in FIG. 10), is far in excess of that of the coated but unfinished substrate (pictured in FIG. 9) as well as the products which have been dry calendered, namely, samples C and D (C is pictured in FIG. 11). Furthermore, the Tack value or pick resistance of the product of the invention B far exceeds that of samples C and D which were dry calendered. In particular, it will be noted that the Tack value of B exceeds that of the coated substrate prior to calendering.

Figure 8:
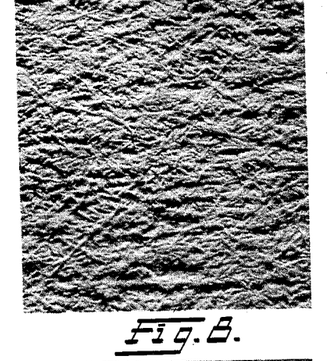
FIG. 8 shows the extreme roughness of conventional uncoated raw stock.
Figure 9:
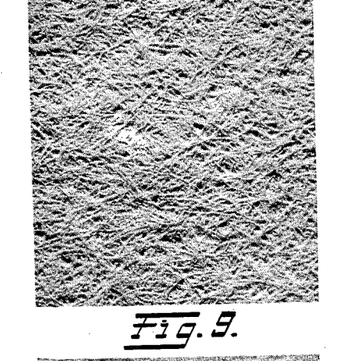
FIG. 9 shows the raw stock after it has been coated with excess coating having been removed by a doctor device.

A somewhat greater understanding may be obtained by the pictorial comparison presented in FIGS. 8–11. FIG. 8 shows the paper base or rawstock prior to application of the particulate coating. As is clearly seen in the picture, the rawstock surface is quite rough in appearance having many hills and valleys as well as other surface deformities. FIG. 9 shows the rawstock of FIG. 8 after it is coated as taught in the present example, but without finishing. Although the hills, valleys and other deformities in the paper base have been somewhat improved, the surface remains extremely rough in appearance.

FIG. 10 is a photomicrograph of the product of the invention, sample B, and it will be apparent that the surface is smooth, uniform and continuously covered by a film which is virtually free of any holes or other deformities. The unusual levelness of the coating surface is readily apparent from the absence of hills and valleys. Although fibers can be discerned within the layer of coating itself, they are each fully covered, many being quite visibly anchored within the film of coating. In comparison, FIG. 11 shows the sample corresponding to B in which the coated substrate has been dry calendered. Many holes and other surface deformities are readily apparent. Moreover, the surface of the coating is not nearly as level as the product of the invention pictured in FIG. 10.

An attempt in sample E to finish a corresponding coated rawstock by a procedure employing the application of water to the coating surface immediately upon entering the nip failed completely to reproduce the unique results of the invention since no significant improvement in gloss was obtained and, moreover, the Tack value was unacceptably low. Moreover, after the first few moments of operation in this manner the coating "scaled" or adhered to the finishing roll.

It is emphasized that the finishing treatment of the invention is in direct contrast with the results achieved by the ordinary dry calendering. Stated briefly, the invention provides improved levelness, superior gloss, together with a strong coating to substrate bond. These are clearly evident in the data reported hereinabove and by a comparison of FIGS 10–11. The dry calendered product on the other hand is grossly decreased in strength in comparison with the strength values achieved in the invention.

Noteworthy is that fact that the unique product of the invention, B, has a gloss in excess of 75 and a smoothness less than 35 with less than 6.5 pounds of coating per ream. In addition, the ink receptivity and holdout of the product, printed by conventional rotogravure and other processes, was excellent.

EXAMPLE II (A) The rewetting technique was performed by applying coating on an off-machine coater with rewetting and finishing in a separate operation.

The paper substrate weighed 55 pounds per ream and had a preliminary tub size application of starch. The coater, similar to that depicted in FIG. 3 of U.S. Patent 2,729,192, had a ¼" diameter doctor rod and was operated at a speed of 500 feet per minute.

The coating contained the following, parts given on a dry weight basis:

Parts of clay _________________________________ 90
Parts of blue pigment _________________________ 10
Part of polyvinyl pyrrolidone (dispersing agent for the blue pigment) __________________________ 1
Parts of a copolymer of 60% vinyl acetate with 40% ethyl acrylate (43% total solids emulsion) ______ 20
Parts of the wax blend of Example I made up with water to 51% total solids ____________________ 3

The coated substrate, having 4 pounds of coating per ream dry, was dried against the heated metal drying drums following the coater to a moisture content of 3% and wound up in rolls.

The apparatus of FIG. 4 was employed with roll 27 metering water from pan 28 onto the coating layer and the excess being doctored off by rotating doctor rod 29, diameter ¼". At a speed of 300 lineal feet per minute, the unfinished coated substrate having a moistened layer of coating was subjected to a bank 35 of infrared lamps, disposed over an area of approximately 12 square feet, and then passed into and out of nip 40, being finally wound up again in roll form. The lamps had a power input of 45 kilowatts and the heat was directed toward the coating layer. Back-up roll 39 was a hard pressed cotton fiber roll and finishing roll 44 had a diameter of 12 inches, a polished chromium surface, and was internally heated to a temperature of 240° F. The pressure exerted within the nip, having a cross-sectional area of 0.25 inch, was 5400 pounds per square inch.

The results of the foregoing procedure according to this invention and identified as A was compared to:

(B) Identical procedure with A except that the coating layer was not remoistened prior to entering the pressure nip.

(C) Identical procedure with A except that 2% of the blue pigment was also dispersed in the remoistening aqueous liquid.

(D) Identical procedure with A except that a second layer of coating was applied to the substrate; that is, rather than applying water, coater 25 applied an additional 3 to 4 pounds per ream dry of coating to that initially applied. The additional coating was the same as that applied on the off machine coater.

The results were as follows:

|   | Gloss | Opacity | Brightness | Bulk | Smoothness | Tack |
|---|---|---|---|---|---|---|
| Substrate | 8.0 | 91.8 | 82.3 | 268 | 165.7 | 600 |
| Coated Substrate before Finishing | 10.4 | 98.8 | 24.7 | 256 | 200.6 | 320 |
| A | 82.8 | 98.0 | 21.1 | 348 | 35.0 | 301 |
| B | 56.5 | 98.8 | 21.7 | 328 | 58.6 | 210 |
| C | 85.5 | 99.1 | 17.6 | 352 | 34.6 | 327.5 |
| D | 85.0 | 99.2 | 13.2 | 376 | 60.8 | 537 |

Densification of the coated substrate in accordance with this invention, procedures A, C and D, is characterized by a loss in Tack of less than about 50% from the original rawstock whereas dry densification, as per B, has resulted in a considerably greater loss. In addition, A, C and D were free of coating picks, i.e., fibers were separated from fibers, indicating that a stronger bond was obtained of coating to coating and coating to substrate than the internal strength of the rawstock.

The decrease in brighness is attributed to the presence of colored pigment in the coating.

EXAMPLE III (A) For coating and finishing in a unitary process, a coating composition was prepared of the following, parts given on a dry weight basis:

Parts of TiO₂ _______________________________ 100
Parts of a copolymer of 60% vinyl acetate and 40% ethyl acrylate (43% total solids emulsion) _____ 30
Parts of the wax blend of Example I ____________ 20
Parts blue pigment (34% total solids dispersion) ___ 5
Parts sodium hexametaphosphate (pigment dispersant) with the mixture made up with sufficient water to provide a total solids content of 50.5% ______ 0.5

Employing an arrangement as shown in FIG. 4, approximately 6.3 pounds per ream, dry basis, of coating was applied to a cellulosic paper substrate of 42 pounds per ream which had an initial lightweight conventional coating of casein adhesive and calcium carbonate. The coater employed utilized a ⅜" diameter mounted rotating doctor rod following a reverse applicator roll as shown in FIG. 4. A bank of quartz lamps with a power input of approximately 38 kilowatts, over an area of 12 sq. ft., was positioned a few inches from the moving web with the heat directed toward the coated side to thereby dry the exposed surface such that it was dry to the touch. The finishing roll had a polished chromium surface, a diameter of 12 inches, and was internally heated to a temperature of 225° F. The back-up roll employed was a hard pressed cotton fiber roll with a diameter of 14 inches. The size of the nip was approximately 0.25 inch in width. Variations in the nip pressure were made during the run; namely, 3300 pounds per square inch, 4900 pounds per square inch and 5400 pounds per square inch with no noticeable change being detected in the resulting product.

The coated web moving at 300 lineal feet per minute was led directly into the nip, partially about the fiber roll upon exit, and thereafter into six additional nips of the calender stack. Upon entering the nip, the exposed surface of the coating was non-tacky and dry to the touch. Similarly the uncoated side of the substrate was dry to the touch since the moisture absorbed by the substrate only partially penetrated. A visible film of wax could readily be discerned upon the chromium roll after the first few moments of the operation and this was maintained throughout the operation by replenishment from the coating.

The resulting blue tinted product had a high gloss, an exceptional surface coverage, uniform print receptivity, and outstanding opacity retention.

Properties of the product (at 5400 pounds per square inch) were as follows:

|   | Gloss | Opacity | Brightness | Bulk | Smoothness | Tack |
|---|---|---|---|---|---|---|
| Substrate | 4 | 81.6 | 78.8 | 392 | 88.0 | >50 |
| Pressure nip coated | 86 | 96.8 | 36.0 | 488 | 12.7 | 190 |

The Tack test did not indicate coating picks but rather failures within the substrate. In contrast to the product of the invention, the Tack of a coating of filler and water absorptive adhesive would normally be less than about 50.

(B) The entire procedure of A above was reepated but replacing the 30 parts of copolymer adhesive therein with 30 parts, dry basis, of a polyvinyl acetate emulsion of 46% total solids. The resulting coating had a total solids content of 51.5% and quantity applied to the sheet was 6.0 pounds per ream dry. Appearance of the sheet including gloss and other optical properties was virtually identical to that obtained in part A, specifically these were as follows:

Gloss _____________________________________ 79.6
Opacity ___________________________________ 96.1
Brightness _________________________________ 42.3
Bulk ______________________________________ 472
Smoothness _______________________________ 22.4
Tack ______________________________________ 125

EXAMPLE IV (A) Following the procedure of Example III a coating composition was prepared of the following, parts given on a dry weight basis:

Parts of TiO₂ _______________________________ 100
Parts of polyvinyl acetate (46% total solids emulsion) ___________________________________ 30
Parts of the wax blend as used in Example I with the mixture made up to a total solids content of 50% with water ________________________________ 5

The coater, finishing apparatus, and substrate of Example III were employed with only the differing process conditions of: ¼" diameter rotating doctor rod, pressure of 5400 pounds per square inch, and 4.1 pounds per ream, dry basis, of coating applied. The resulting sheet had excellent surface properties and was readily receptive to printing inks. Properties were as follows:

|   | Gloss | Opacity | Brightness | Bulk | Smoothness | Tack |
|---|---|---|---|---|---|---|
| Substrate | 4.0 | 81.6 | 78.8 | 392 | 88.0 | <50 |
| Pressure Nip Coated | 100+ | 84.1 | 75.9 | 512 | 15.9 | >100 |

The ultimate value in gloss which was achieved, particularly with the extraordinary improvement in smoothness and Tack, is especially remarkable from the standpoint of the low coating weight.

(B) Same conditions as in A except that the chromium roll temperature was 235° F. and the total solids content of the coating was 47%. The amount of coating applied was 3.35 pounds per ream, dry basis.

The properties of the product were as follows:

| | |
|---|---|
| Gloss | 88.4 |
| Opacity | 83.2 |
| Brightness | 77.3 |
| Bulk | 496 |
| Smoothness | 21.7 |
| Tack | >100 |

EXAMPLE V (A) Again employing the apparatus of Example III, a coated two sides paper substrate was prepared by successive coating operations. The substrate was a 64 pound per ream paper rawstock having a conventional light weight casein and pigment coating on each side.

Coating formulation for each side, dry basis:

| | |
|---|---|
| Parts predispersed clay | 100 |
| Parts of a copolymer of 60% vinyl acetate and 40% ethyl acrylate (43% total solids emulsion) | 15 |
| Parts of wax blend of Example I with water to 50% total solids | 5 |

Differing process conditions were 1/4" diameter rotating doctor rod, chromium roll temperature of 230° F., and nip pressure of 5400 pounds per square inch. Coating applied to the wire side was 2.3 pounds per ream dry and that applied to the felt side was 1.5 pounds per ream dry. The product was characterized by complete surface coverage with a high degree of flatness, gloss and ink holdout. Properties were as follows:

| | Gloss | Opacity | Brightness | Bulk | Smoothness | Tack |
|---|---|---|---|---|---|---|
| Substrate | 4 | 81.6 | 78.8 | 392 | 88.0 | <50 |
| Wire Side | 89.4 | 90.3 | 74.4 | 392 | 49.8 | >100 |
| Felt Side | 88.3 | 90.3 | 74.4 | 392 | 45.1 | >100 |

(B) Part A was repeated employing an uncoated but starch tub-sized rawstock of 45 pounds per ream. Temperature of the coating surface just before the nip was 210° F. Coating so applied to the felt and wire sides respectively was 3.0 and 2.4 pounds per ream respectively.

Comparable results to A were obtained with respect to optical properties, bulk, smoothness and Tack. Significant is the fact that a two side coated printing paper was produced with only a moderate increase in weight from that of the original lightweight rawstock.

EXAMPLE VI (A) Example V (part A) was repeated under identical conditions except that 50 parts of calcium carbonate pigment was employed in place of 50 parts of predispersed clay and only one side of the substrate was coated. Results were as follows:

| | Gloss | Opacity | Brightness | Bulk | Smoothness | Tack |
|---|---|---|---|---|---|---|
| Substrate | 4 | 81.6 | 78.8 | 392 | 88.0 | <50 |
| Pressure Nip Coated | 77.9 | 91.1 | 76.8 | 368 | 29.2 | >100 |

(B) Part A was repeated employing 65 parts calcium carbonate and 35 parts clay as the pigment.

| | Gloss | Opacity | Brightness | Bulk | Smoothness | Tack |
|---|---|---|---|---|---|---|
| Substrate | 4 | 81.6 | 78.8 | 392 | 88.0 | <50 |
| Pressure Nip Coated | 79.0 | 90.3 | 76.1 | 376 | 28.3 | >100 |

(C) The procedure of A was repeated using a heavy weight paperboard as the substrate. Differing process variables were a coating solids content 60% by weight, containing also 0.5 part of sodium hexametaphosphate, and four additional calender nips were used following chromium roll nip.

Nip pressure of 3300 and 5400 pounds per square inch were employed with the following results:

| | Nip Pressure | Gloss | Caliper (inches) |
|---|---|---|---|
| Uncoated Rawstock | | <10 | 0.0155. |
| Coated Rawstock | 3,300 | 50 | 0.0142 to 0.0146. |
| Coated Rawstock | 5,400 | 54 | 0.0130 to 0.0140. |

With only a moderate sacrifice in caliper, a significant improvement in gloss was achieved to provide a product highly suitable for packaging purposes.

EXAMPLE VII (A) The effect which varying conditions of speed, consequently moisture content of the coated substrate, have upon the resulting optical properties is shown by the following.

The coating formulation was prepared of:

| | |
|---|---|
| Parts of high brightness clay | 100 |
| Parts of a copolymer of 60% vinyl acetate and 40% ethyl acrylate (43% total solids emulsion) | 20 |
| Parts of wax blend of Example I with water to 55% total solids | 3 |

For operation of the process by freshly applying coating and finishing, the apparatus as described in FIG. 4 was utilized with:

1/4" diameter doctor rod
chromium finishing roll, temperature 230° F., 12 inch diameter
nip size 0.25 inches, fiber back-up roll
nip pressure of 5400 pounds per square inch
substrate, 56 pounds per ream, starch tub-sized
quartz lamps, 45 kilowatts (over 12 square feet of area), in close proximity to coating layer Throughout an extended run of many thousand pounds of paper, the sheet was very attractive, had a good gloss, high brightness and opacity, and was extremely flat and smooth. Offset printing gave a high degree of ink-holdout and yielded virtually no picking.

Properties of the product were:

| | Speed Lin., ft./min. | Gloss | Opacity | Brightness | Bulk | Smoothness | Tack |
|---|---|---|---|---|---|---|---|
| Substrate | | 8.8 | 94.7 | 86.9 | 228 | 168.0 | 612+ |
| 1 | 630 | 70.3 | 92.9 | 83.1 | 368 | 37.2 | 520 |
| 2 | 420 | 62.8 | 92.2 | 82.7 | 392 | 34.6 | 296 |

From the foregoing it is apparent that, under the same conditions of having a coating surface which is dry to the touch, an increase in speed to provide greater moisture within the substrate actually gives an improved gloss and Tack without significantly sacrificing other properties.

(B) The procedure of A was repeated employing 100 parts of zinc oxide in place of the clay thereof and increasing the resin adhesive to 25 parts with the speed and nip pressures constant at 420 lineal feet per minute and 5400 pounds per square inch respectively. Although gloss was low owing to the nature of the pigment, other optical properties, particularly levelness, were very attractive.

(C) The procedure of A was repeated employing 3 parts, dry basis, of emulsified sugar cane wax (softening point 176–178° F.) in place of the wax blend with the speed and nip pressures constant at 420 lineal feet per minute and 5400 pounds per square inch respectively. Again gloss, smoothness and Tack were outstanding.

EXAMPLE VIII (A) Following the procedure of Example IV there was applied to a 50 pound per ream, starch tubsized paper substrate about 4 pounds per ream dry of a coating containing on a dry weight basis:

| | |
|---|---|
| Parts of clay | 100 |
| Parts of a copolymer of 80% vinyl acetate, 1.5% acrylic acid and 18.5% 2-ethyl hexyl acrylate (51% total solids emulsion) | 20 |
| Parts of the wax blend as used in Example I | 3 |

The chromium roll temperature was 245° F. and the nip pressure was 5400 pounds per square inch. The process was preformed at various intervals of speed up to 1000 feet per minute although some loss in gloss was noted at the particularly high speeds. At 300 feet per minute the following test data was obtained:

| | Gloss | Opacity | Brightness | Bulk | Smoothness | Tack |
|---|---|---|---|---|---|---|
| Rawstock | 9.5 | 91.5 | 86.5 | 288 | 167.2 | 612+ |
| Pressure Nip Coated | 75.5 | 90.7 | 82.6 | 400 | 32.2 | 612+ |

For offset printing the extremely high Tack in combination with the gloss and sheet smoothness or levelness yields excellent resolution and ink holdout.

(B) The procedure of A was repeated using a coating of the following, parts on a dry weight basis:

| | |
|---|---|
| Parts of clay | 100 |
| Parts of polyethylene M.W. of 15,000–30,000, density of 0.92–0.935, Shore D hardness of 45–48 (used as 50% solids anionic emulsion) made up with water to 55% total solids | 50 |

Temperature of the chromium finished roll was 160° F. Properties were as follows:

| | |
|---|---|
| Gloss | 51.8 |
| Opacity | 89.4 |
| Brightness | 83.3 |
| Bulk | 368 |
| Smoothness | 48.0 |
| Tack | 323 |

(C) The procedure of A was repeated using a coating of the following, parts on a dry weight basis:

| | |
|---|---|
| Parts of clay | 100 |
| Parts of a 40% total solids emulsion of a copolymer of methacrylic acid, butyl methacrylate and ethyl acrylate in the ratio of 2:1:3 made up with water to 55% total solids | 50 |

Temperature of the chromium finishing roll was 160° F. Properties was as follows:

| | |
|---|---|
| Gloss | 49.8 |
| Opacity | 89.4 |
| Brightness | 83.2 |
| Bulk | 362 |
| Smoothness | 39.2 |
| Tack | 289 |

(D) The procedure of A was repeated using a coating prepared of:

| | |
|---|---|
| Parts of clay | 100 |
| Parts of polyvinylidene chloride emulsion (60% total solids) having a specific gravity of 1.37 and a viscosity (Brookfield #1 spindle 60 r.p.m.) of approximately 25 cps. at 77° F. made up with water to 55% total solids | 50 |

Temperature of the chromium finishing roll was 150° F. Properties were as follows:

| | |
|---|---|
| Gloss | 49.8 |
| Opacity | 90.9 |
| Brightness | 84.0 |
| Bulk | 336 |
| Smoothness | 46.6 |
| Tack | 306 |

In samples B, C and D gloss was significantly improved but nevertheless comparatively low, owing to the nature of the adhesive and the moderate finishing roll temperature, a valuable improvement was achieved however in smoothness and Tack.

It is to be understood that various changes and modifications can be made without departing from the spirit and scope of the invention as defined in the appended claims.

I claim:

1. A method for the continuous production of coated paper having a finished print-receptive surface comprising the steps of:
    (a) applying to a relatively dry fibrous cellulosic paper substrate an aqueous coating containing a major weight proportion of finely divided solid mineral filler in intimate admixture with a minor weight proportion of non-water absorptive, film-forming, heat softenable resin particles,
    (b) subjecting the coated substrate to an elevated temperature applied from the coated side of the paper to form an exposed coating surface which is dry to the touch and to facilitate at least partial drainage of the water content of said coating into said substrate to render the surface of the substrate adjacent said coating sufficiently wet with water to be pressure deformable, and
    (c) passing the resultant coated substrate through a nip between a pair of turning rolls, at least one of said rolls having a heated finishing surface and contacting the exposed surface of said coating, to apply sufficient heat and pressure to cause said resin particles to at least partially coalesce to provide a visually continuous print-receptive surface coating which is securely bonded to the said substrate.

2. A method for the continuous production of coated paper having a finished print-receptive surface comprising the steps of:
    (a) applying to a fibrous cellulosic paper substrate an aqueous coating containing a major weight proportion of finely divided solid mineral filler in intimate admixture with a minor weight proportion of non-water absorptive, film-forming, heat softenable resin particles,
    (b) at least partially drying said coated substrate,
    (c) remoistening the coated surface of the substrate with water,
    (d) subjecting the remoistened coated substrate to an elevated temperature applied from the coated side of the paper to form an exposed coating surface which is dry to the touch and to facilitate at least partial drainage of the water content of said coating into said substrate to render the surface of the substrate adjacent said coating sufficiently wet with water to be permanently pressure deformable, the opposite side of said substrate also being dry to the touch, and (e) passing the resultant coated substrate through a nip between a pair of turning rolls, at least one of said rolls having a heated finishing surface and contacting the exposed surface of said coating, to apply sufficient heat and pressure to cause said resin particles to at least partially coalesce to provide a visually continuous print-receptive surface coating which is securely bonded to the said substrate.

3. A method for the continuous production of coated paper having a finished print-receptive surface comprising providing a fibrous cellulosic paper substrate having on at least one surface thereof, a layer of a major weight proportion of finely divided solid mineral filler in intimate admixture with a minor weight proportion of non-water absorptive, film-forming, heat-softenable resin particles, the surface of said substrate adjacent said layer being sufficiently wet with water to be permanently pressure deformed, the exposed surface of said layer and the surface of said substrate remote from said layer being dry to the touch, and passing said paper substrate through the nip between a pair of turning rolls, at least one of which has a heated finishing surface, with said layer in contact with said finishing surface, said turning rolls applying sufficient heat and pressure to cause said resin particles to at least partially coalesce and to apply shearing forces to said layer to provide a visually continuous print-receptive surface coating which is securely bonded to the said substrate.

4. A method as recited in claim 3 in which said layer is deposited on said substrate in an amount up to 9 pounds dry per 3300 square feet of surface.

5. A method as recited in claim 3 in which a molten deposit of a waxy material is maintained on said finishing surface.

6. A method for the continuous production of coated paper having a finished print-receptive surface comprising providing a dry fibrous cellulosic paper substrate having on one surface thereof, a wet layer of a major weight proportion of finely divided solid mineral filler in intimate admixture with a minor weight proportion of non-water absorptive, film-forming, heat softenable resin particles, applying heat to said paper substrate from the side of said substrate surfaced with said wet layer to dry said layer and cause the surface of said substrate adjacent said layer to become sufficiently wet with water to be permanently pressure deformed with the exposed surface of said layer being dry to the touch, and passing said paper substrate through the nip between a pair of turning rolls, at least one of which has a heated finishing surface, with said layer in contact with said finishing surface, said turning rolls applying sufficient heat and pressure to cause said resin particles to at least partially coalesce and to apply shearing forces to said layer to provide a visually continuous print-receptive surface coating which is securely bonded to the said substrate.

7. A method for the continuous production of coated paper having a finished print-receptive surface comprising providing a dry fibrous cellulosic paper substrate having on one surface thereof, a wet layer of a major weight proportion of finely divided solid mineral filler in intimate admixture with a minor weight proportion of non-water absorptive, film-forming, heat-softenable resin particles, said layer being present in an amount up to 9 pounds dry per 3300 square feet of surface, applying heat to said paper substrate from the side of said substrate surfaced with said wet layer to dry said layer and cause the surface of said substrate adjacent said layer to become sufficiently wet with water to be permanently pressure deformed with the exposed surface of said layer and the surface of said substrate remote from said layer being dry to the touch, and passing said paper substrate through the nip between a pair of turning rolls, at least one of said rolls having a finishing surface heated to a temperature within the range of 190° to 350° F., with said layer in contact with said finishing surface, said turning rolls applying heat and a pressure at the nip of about 1500 to 7500 p.s.i. to level the portion of the substrate adjacent said layer, to cause said resin particles to at least partially coalesce and to apply shearing forces to said layer to provide a visually continuous print-receptive surface coating which is securely bonded to the said substrate.

8. Coated paper having a finished print-receptive surface comprising a fibrous cellulosic substrate having securely bonded to at least one surface thereof a coating film comprising a major weight proportion of finely divided solid mineral filler adhesively secured by a minor weight proportion of at least partially coalesced, non-water absorptive resin particles, the quantity of said coating film being not in excess of about 6.5 pounds per 3300 square feet of surface, said coated paper being characterized by a gloss of at least 75 and a Sheffield smoothness of less than about 35, and being permanently pressure deformed with the permanent deformation of the substrate being largely confined to the portion thereof underlying said film to provide maximum leveling with minimum overall compression.

9. Coated paper having a finished print-receptive surface comprising a fibrous cellulosic substrate having bonded to at least one surface thereof a visually continuous, print-receptive film comprising a major weight proportion of finely divided solid mineral filler adhesively secured by a minor weight proportion of at least partially coalesced, non-water absorptive resin particles bonding the particles of said filler together into a film, said film being bonded to said surface with a strength at least approximating the internal strength of said substrate, said non-water absorptive resin particles constituting the essential agent securing said film to said substrate, and said coated paper being permanently pressure deformed with the permanent deformation of the substrate being largely confined to the portion thereof underlying said film to provide maximum leveling with minimum overall compression.

10. Coated paper having a finished print-receptive surface comprising a fibrous cellulosic substrate having bonded to at least one surface thereof a visually continuous, print-receptive film comprising a major weight proportion of finely divided solid mineral filler adhesively secured by a minor weight proportion of at least partially coalesced, non-water absorptive resin particles bonding the particles of said filler together into a film, said non-water absorptive resin particles constituting the essential agent securing said film to said substrate, and said coated paper being permanently pressure deformed with the permanent deformation of the substrate being largely confined to the portion thereof underlying said film to provide maximum leveling with minimum overall compression.

References Cited by the Examiner

UNITED STATES PATENTS

| | | | |
|---|---|---|---|
| 2,321,938 | 6/1943 | Quinn | 117—60 |
| 2,826,827 | 3/1958 | Metz | 117—64 X |
| 2,919,205 | 12/1959 | Hart | 117—64 |
| 3,028,258 | 4/1962 | Rice | 117—64 |

WILLIAM D. MARTIN, *Primary Examiner.*

RICHARD D. NEVIUS, *Examiner.*

G. L. WELLS, H. W. MYLIUS, *Assistant Examiners.*